(12) United States Patent
Neo et al.

(10) Patent No.: US 11,059,236 B2
(45) Date of Patent: Jul. 13, 2021

(54) METHOD OF EXTRACTING MANDREL FOR HOLLOW-HAT PANEL PRODUCTION

(71) Applicant: ROHR, INC., Chula Vista, CA (US)

(72) Inventors: Mong Phing Neo, Singapore (SG); Chittibabu Sridharakannan, Singapore (SG); Ling Jie Jae Tan, Singapore (SG); Yew Tuck Wong, Singapore (SG)

(73) Assignee: Rohr, Inc, Chula Vista, CA (US)

( * ) Notice: Subject to any disclaimer, the term of this patent is extended or adjusted under 35 U.S.C. 154(b) by 0 days.

(21) Appl. No.: 16/904,185

(22) Filed: Jun. 17, 2020

(65) Prior Publication Data

US 2020/0316875 A1 Oct. 8, 2020

Related U.S. Application Data

(62) Division of application No. 14/973,119, filed on Dec. 17, 2015, now Pat. No. 10,723,085.

(51) Int. Cl.
| | |
|---|---|
| *B29C 33/48* | (2006.01) |
| *B29C 65/00* | (2006.01) |
| *B29C 33/44* | (2006.01) |
| *B29C 37/00* | (2006.01) |
| *B64F 5/10* | (2017.01) |
| *B64D 29/06* | (2006.01) |
| *B29L 31/30* | (2006.01) |

(52) U.S. Cl.
CPC ............ *B29C 66/49* (2013.01); *B29C 33/442* (2013.01); *B29C 33/485* (2013.01); *B29C 37/0003* (2013.01); *B29C 66/005* (2013.01); *B29C 66/13* (2013.01); *B29C 66/43* (2013.01); *B64D 29/06* (2013.01); *B64F 5/10* (2017.01); *B29L 2031/3076* (2013.01)

(58) Field of Classification Search
CPC ...... B29C 33/442; B29C 33/505; B29C 66/49
See application file for complete search history.

(56) References Cited

U.S. PATENT DOCUMENTS

| | | | |
|---|---|---|---|
| 3,567,173 A | | 3/1971 | Peterson |
| 3,911,895 A | * | 10/1975 | Van Schoyck .......... F24C 15/20 126/16 |
| 3,949,969 A | * | 4/1976 | Kaufer ................. B66D 1/7415 254/333 |

(Continued)

FOREIGN PATENT DOCUMENTS

| | | |
|---|---|---|
| JP | S59148638 | 8/1984 |
| WO | 2005105402 | 11/2005 |

(Continued)

OTHER PUBLICATIONS

VDWinch1234_Screenshot of YouTube video "Winch extraction for rigid mandrel", published Dec. 11, 2014; retrieved Mar. 18, 2019 from https://www.youtube.com/watch?v=KWACx7hWBcs (Year: 2014).

(Continued)

*Primary Examiner* — Scott W Dodds
(74) *Attorney, Agent, or Firm* — Snell & Wilmer L.L.P.

(57) ABSTRACT

A panel may be formed with mandrels inside of stiffening members. The panel may be coupled to a panel holding jig. A winch may be coupled to the mandrels. The winch may pull the mandrels out of the stiffening members and into curved tracks.

7 Claims, 8 Drawing Sheets

(56) References Cited

U.S. PATENT DOCUMENTS

| | | | |
|---|---|---|---|
| 4,218,419 A | 8/1980 | Alfio | |
| 5,176,364 A * | 1/1993 | Bell | B66D 1/08 254/291 |
| 5,387,098 A | 2/1995 | Willden | |
| 5,622,733 A | 4/1997 | Asher | |
| 5,900,194 A | 5/1999 | Ashton | |
| 6,458,309 B1 | 10/2002 | Allen et al. | |
| 7,963,039 B2 | 6/2011 | Burnett et al. | |
| 8,528,177 B2 | 9/2013 | Morin et al. | |
| 8,877,114 B2 | 11/2014 | Havens et al. | |
| 2006/0118235 A1 * | 6/2006 | Lum | B64F 5/10 156/285 |
| 2009/0166921 A1 | 7/2009 | Jacob et al. | |
| 2010/0006739 A1 | 1/2010 | Robins et al. | |
| 2015/0122413 A1 | 5/2015 | Inserra Imparato et al. | |
| 2016/0046113 A1 | 2/2016 | Witte et al. | |

FOREIGN PATENT DOCUMENTS

| | | |
|---|---|---|
| WO | 2008003715 | 1/2008 |
| WO | 2015063657 | 7/2015 |

OTHER PUBLICATIONS

China Patent Agent, Chinese First Office Action dated Jun. 20, 2019 in Application No. 201611175072.5.

Extended European Search Report dated May 24, 2017 in European Application No. 16204014.1.

USPTO, Restriction Requirement dated Jan. 11, 2018 in U.S. Appl. No. 14/973,119.

USPTO, Non-Final Office Action dated Mar. 12, 2019 in U.S. Appl. No. 14/973,119.

USPTO, Final Office Action dated May 16, 2019 in U.S. Appl. No. 14/973,119.

USPTO, Advisory Action dated Jul. 1, 2019 in U.S. Appl. No. 14/973,119.

USPTO, Non-Final Office Action dated Oct. 4, 2019 in U.S. Appl. No. 14/973,119.

USPTO, Notice of Allowance dated May 21, 2020 in U.S. Appl. No. 14/973,119.

* cited by examiner

METHOD OF EXTRACTING MANDREL FOR HOLLOW-HAT PANEL PRODUCTION

CROSS-REFERENCE TO RELATED APPLICATION

This application is a divisional of, and claims priority to, and the benefit of U.S. Non-Provisional application Ser. No. 14/973,119, entitled "METHOD OF EXTRACTING MANDREL FOR HOLLOW-HAT PANEL PRODUCTION," filed on Dec. 17, 2015, which is hereby incorporated by reference in its entirety.

FIELD

The present disclosure relates to an aircraft engine nacelle, and more particularly, to fabrication equipment and methods for composite aircraft nacelle components.

BACKGROUND

Many components for aircraft nacelles are manufactured using composite materials. Composite materials tend to have a high strength-to-weight advantage compared to traditional metals. One particular application for the use of composite materials is for fabricating panels. One type of panel may include a single skin with multiple laminar layers that are formed from composite materials such as graphite or an aromatic polyamide fiber of high tensile strength that are embedded in a resin matrix. One or more stiffening members, sometimes referred to as "hollow hats" due to their cross-sectional shape, may extend from the inside (non-aerodynamic) surface of the skin to provide additional strength to the panel. In some cases, a mandrel is used to form the shape of the stiffening member, and the composite skin is co-cured with the stiffening member with the mandrel in place. After the curing process, the mandrel is removed from the panel. However, after the curing process, there may be a significant amount of friction between the mandrel and the panel, and it may be difficult to remove the mandrels in a consistent manner which minimizes the possibility of damage to the cured panel or to the mandrel.

SUMMARY

A method of manufacturing a composite panel with at least one stiffening member formed around a removable mandrel may comprise forming a cured composite panel by co-curing a skin and a hollow stiffening member so that they form a unitary structure; coupling the cured composite panel to a panel holding jig; coupling a clamp to a mandrel situated between the skin of the cured composite panel and the hollow stiffening member; and operating a winch to extract the mandrel from the cured composite panel.

In various embodiments, the method may comprise pulling the mandrel into a curved track. The cured composite panel may be clamped to the panel holding jig. A height of the curved track may be adjusted. A plurality of mandrels may be pulled from the cured composite panel simultaneously using the winch. The winch may be operated with a hand crank. The winch may comprise a plurality of spools.

A method of manufacturing a composite panel with at least one stiffening member formed around a removable mandrel may comprise curing the composite panel with a first mandrel inside of a stiffening member; coupling the composite panel to a panel holding jig; positioning a mandrel extraction jig adjacent the panel holding jig, the mandrel extraction jig having a curved track formed thereon for receiving the first mandrel; and extracting the first mandrel from the stiffening member so that the first mandrel is supported on the curved track.

In various embodiments, the method may comprise pulling the first mandrel into the curved track. A winch may be coupled to a second mandrel in the composite panel. The first mandrel and the second mandrel may be extracted simultaneously. A height of the curved track may be adjusted. The coupling the winch to the second mandrel may comprise coupling a clamp to the second mandrel. The coupling the winch to the first mandrel may comprise coupling a strap to the clamp.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of various embodiments herein makes reference to the accompanying drawings, which show various embodiments by way of illustration. While these various embodiments are described in sufficient detail to enable those skilled in the art to practice the inventions, it should be understood that other embodiments may be realized and that logical changes and adaptations in design and construction may be made in accordance with this invention and the teachings herein. Thus, the detailed description herein is presented for purposes of illustration only and not of limitation. The scope of the invention is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

A mandrel extraction system may comprise a panel holding jig, a mandrel extraction jig, and a winch. A rigid, cured panel may be placed in the panel holding jig. One or more clamps may keep the cured panel secured. The cured panel is placed in an orientation so that the stiffening members are horizontal. The cured panel may rest on a curved edge of the curved panel. The winch may be attached to a mandrel still situated inside of the stiffening member of the panel. A clamp may clamp on to an end of the mandrel, and a strap or cable coupled to the clamp may be wound around the winch using a hand crank or a winch motor. The winch may comprise multiple straps, enabling multiple mandrels to be extracted simultaneously. The mandrels may be pulled onto the mandrel extraction jig. The mandrel extraction jig may comprise tracks or gutters which may guide and hold the mandrels as they are extracted from the cured panel. The tracks may be curved such that the mandrels maintain a curved shape similar to the shape of the panel.

Figure 1:
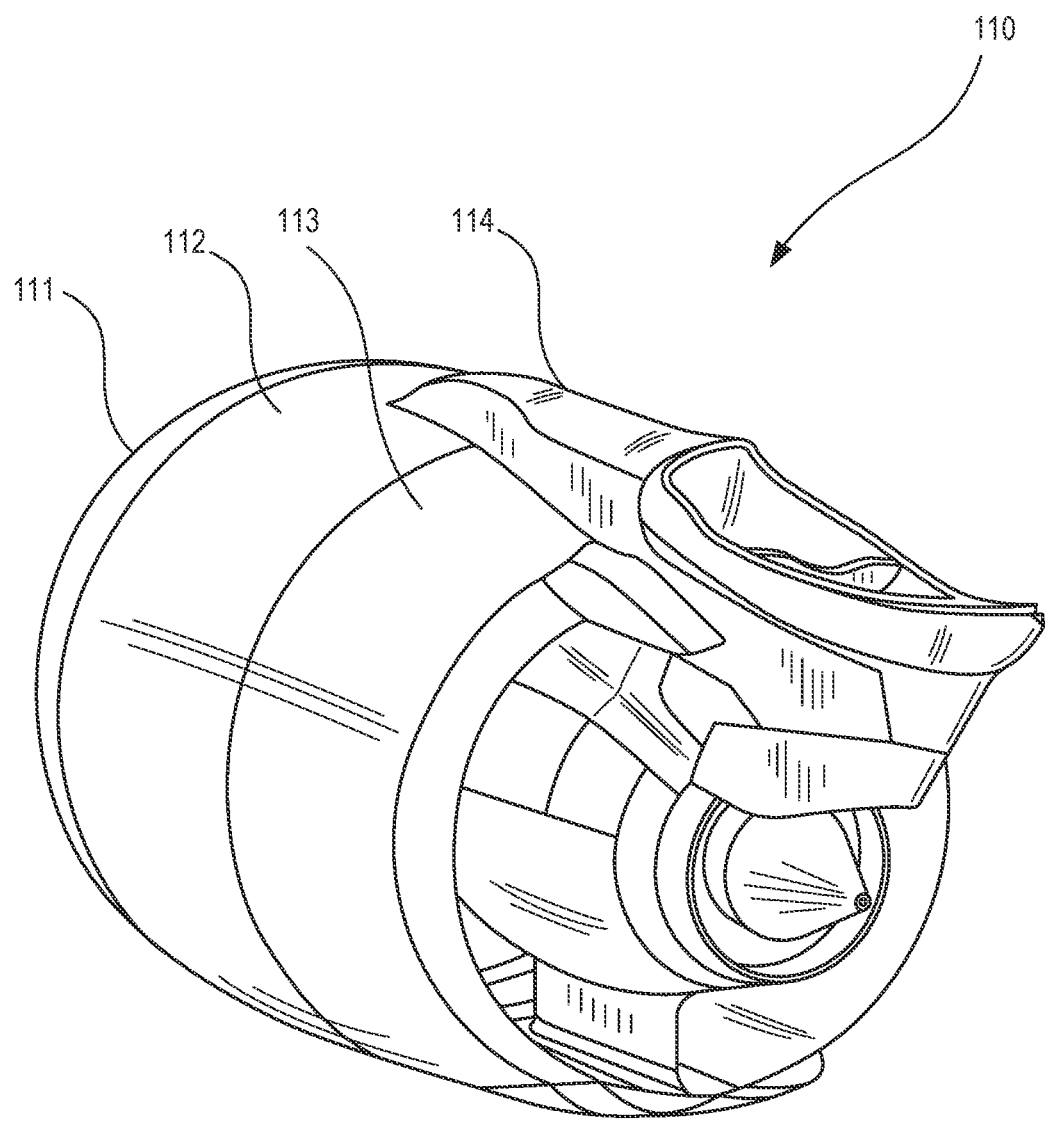
FIG. 1 illustrates a propulsion system and its elements.

Referring to FIG. 1, a nacelle 110 for a gas turbine engine is illustrated according to various embodiments. Nacelle 110 may comprise an inlet 111, a fan cowl 112, and a thrust reverser 113. Nacelle 110 may be coupled to a pylon 114, which may mount the nacelle 110 to an aircraft wing or aircraft body.

Figure 2A:
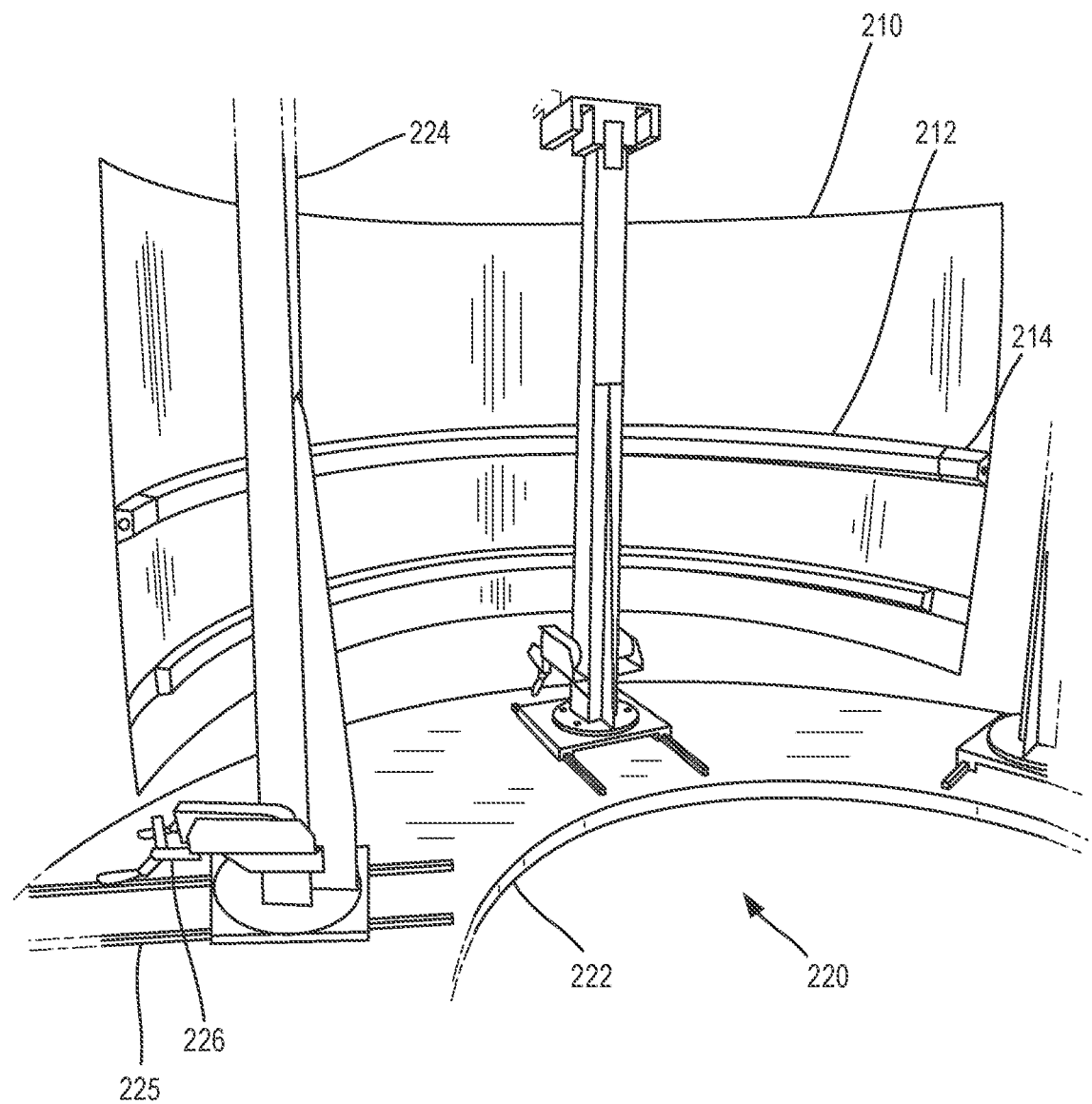
FIG. 2A illustrates a perspective view of a panel holding jig in accordance with various embodiments.

Referring to FIG. 2A, a perspective view of a panel 210 mounted on a panel holding jig 220 is illustrated according to various embodiments. In various embodiments, the panel 210 may be a fan cowl panel, and the panel holding jig 220 may be a fan cowl holding jig. The panel holding jig 220 may comprise a base 222 and a plurality of vertical posts 224. The base 222 may be curved to accommodate the shape of the panel 210. The vertical posts 224 may be adjustable on tracks 225 to accommodate different shapes of panels. The panel holding jig 220 may comprise a plurality of clamps 226. The clamps 226 may be coupled to the vertical posts 224. The clamps 226 may be configured to clamp to the panel 210 to keep the panel 210 in place. The clamps 226 may be vertically adjustable along the vertical posts 224. Additionally, the clamps may be rotated to the interior of the panel holding jig 220 to hold smaller panels.

The panel 210 may comprise a curved panel with stiffening members 212. The panel 210 may be oriented such that the stiffening members 212 are oriented horizontally (e.g. parallel to the ground). The stiffening members 212 may be formed from a composite skin around mandrels 214. The stiffening members 212 may be cured with the mandrels 214 located within the stiffening members 212. The mandrels 214 may comprise an elongated rubber or other elastomeric component which is configured to be removed from the stiffening members 212 after curing of the panel 210. A portion of the mandrels 214 may extend outside the ends of the stiffening members 212 to allow the mandrels 214 to be accessed for removal. The horizontal orientation of the stiffening members 212 may allow the mandrels 214 to be more easily removed. The stiffening members 212 may be referred to as a "hollow hat."

Figure 2B:
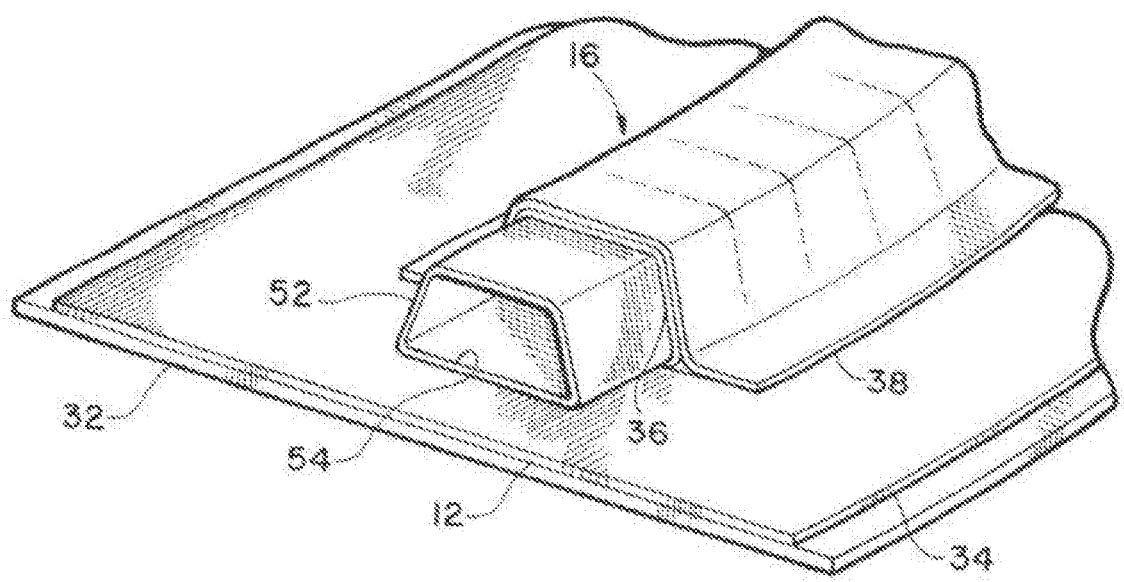
FIG. 2B illustrates a perspective view of a mandrel in a stiffening member in accordance with various embodiments.

Referring to FIG. 2B, a perspective view of a mandrel 52 in a hollow stiffening member 16 is illustrated according to various embodiments. The skin 12 of a panel may comprise a first layer 34 and a second layer 38. The first layer 34 and the second layer 38 may each comprise one or more composite layers formed from a fabric bonded together by a resin matrix. The panel may comprise a stiffening member 16. The stiffening member 16 may be formed by placing a mandrel 52 between the first layer 34 and the second layer 38. The first layer 34 and the second layer 38 may be co-cured with the mandrel 52 in place in order to form the stiffening member 16. The stiffening member 16 may take the shape of the mandrel 52, which may comprise flat sides 54 and angled sides 36. The skin 12 may be cured on a lay-up mandrel 32 to provide the general shape of the skin 12. The first layer 34 and the second layer 38 may be structurally bonded together into a unitary structure during the curing process.

Figure 3:
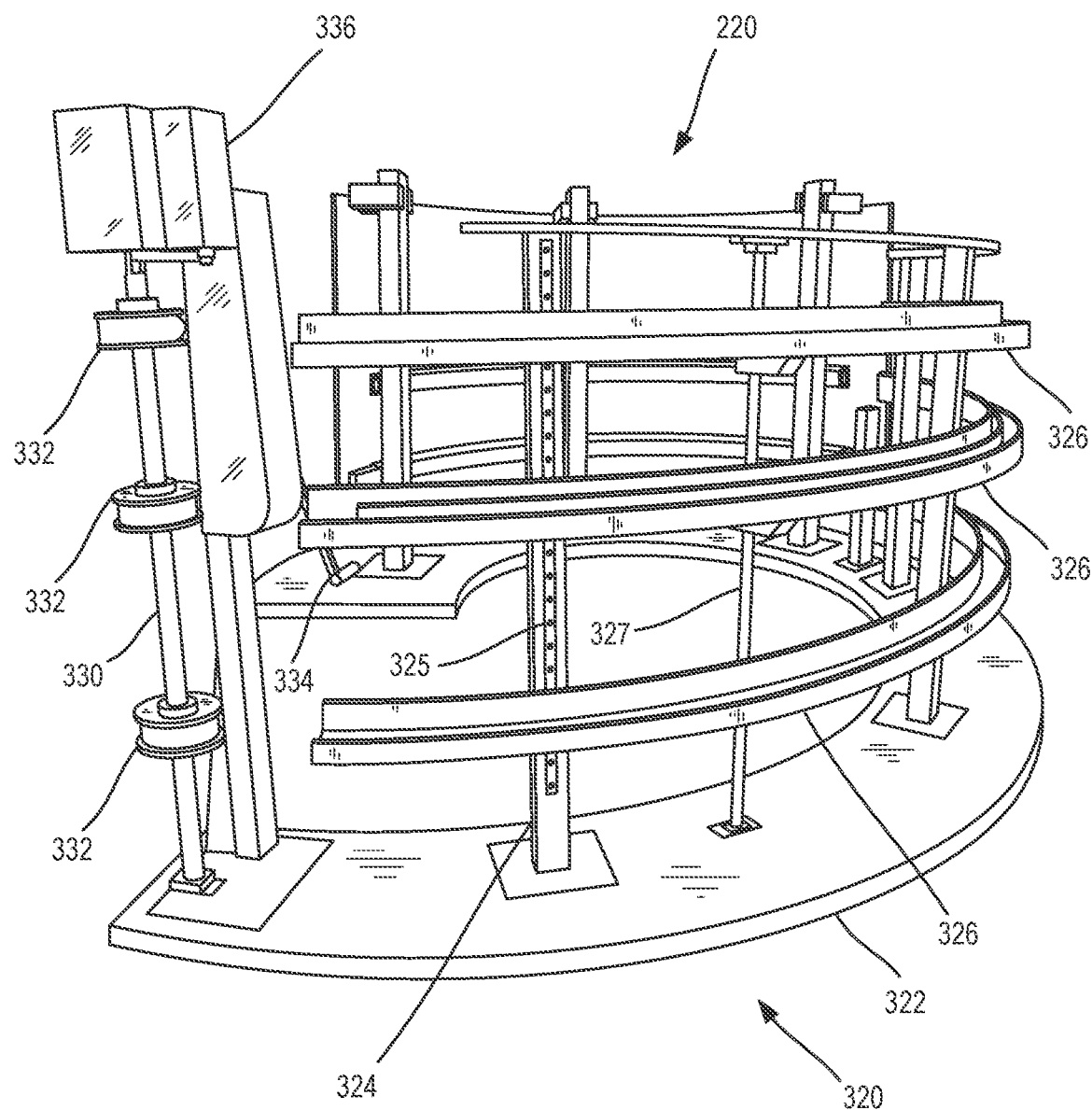
FIG. 3 illustrates a perspective view of a mandrel extraction jig in accordance with various embodiments.

Referring to FIG. 3, a perspective view of a mandrel extraction jig 320 coupled to the panel holding jig 220 is illustrated according to various embodiments. The mandrel extraction jig 320 may comprise a curved base 322. A plurality of vertical posts 324 may be coupled to the curved base 322. A plurality of horizontal curved tracks 326 may be coupled to the vertical posts 324. The curved tracks 326 may be configured to support the mandrels as the mandrels are removed from the panel 210. The vertical posts 324 may comprise a mounting track 325. The curved tracks 326 may be coupled to different heights on the mounting track 325 to correspond to the heights of the stiffening members on the panel 210. An adjustable support 327 may be coupled to the curved base 322. The adjustable support 327 may be raised or lowered to adjust the height of the curved tracks 326. A winch 330 may be coupled to the curved base 322. The winch 330 may comprise a plurality of spools 332. The winch 330 may be operated by a hand crank 334 or by a motor 336.

Figure 4:
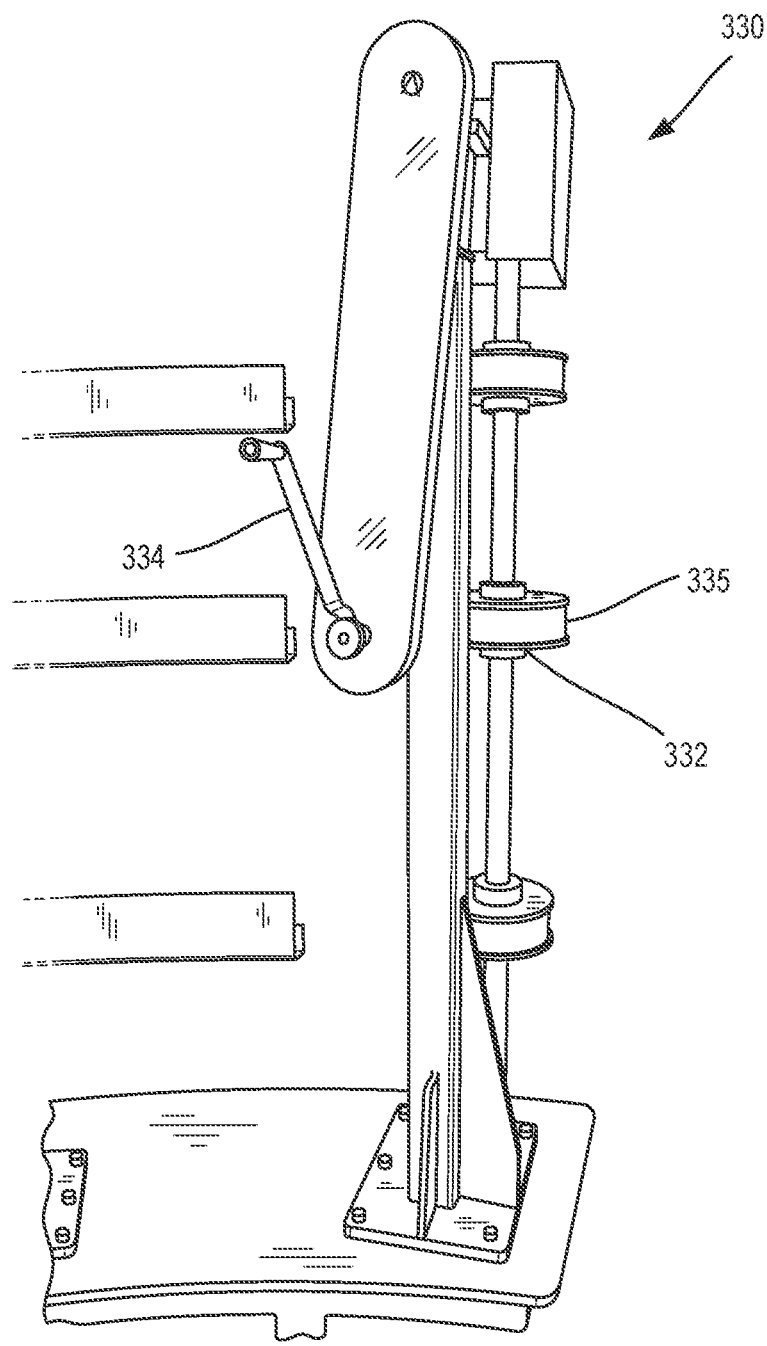
FIG. 4 illustrates a perspective view of a winch in accordance with various embodiments.

Referring to FIG. 4, a perspective view of the winch 330 is illustrated according to various embodiments. The hand crank 334 may be turned in order to wind-up or pay-out straps 335 on the spools 332. The winch 330 may operate multiple spools 332 simultaneously in order to remove multiple mandrels simultaneously.

Figure 5:
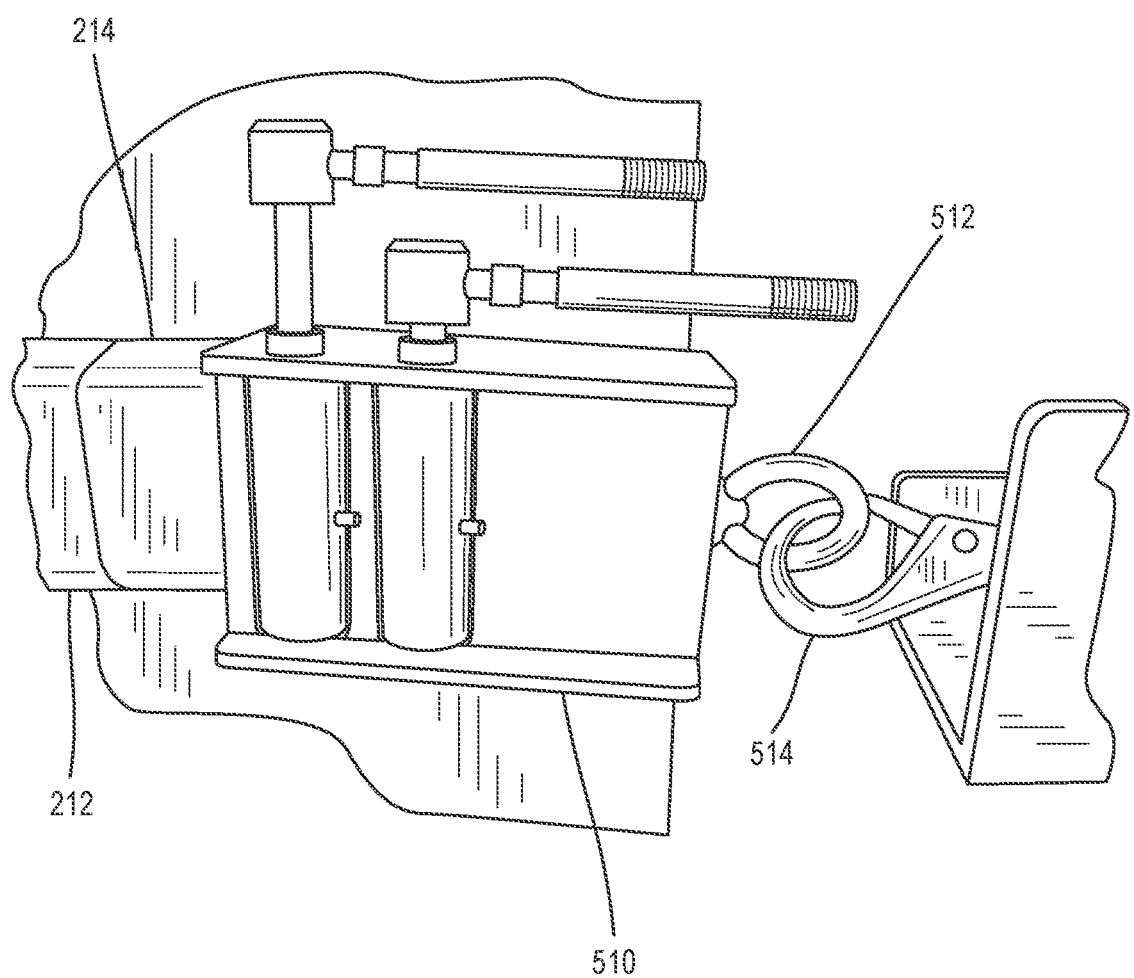
FIG. 5 illustrates a perspective view of a mandrel clamp in accordance with various embodiments.

Referring to FIG. 5, a perspective view of a mandrel clamp 510 is illustrated according to various embodiments. The mandrel clamp 510 may be coupled to a mandrel 214. The mandrel clamp 510 may comprise an attachment ring 512. A clip 514 may be coupled to the attachment ring 512. The clip 514 may be coupled to a strap or cable, which may be operated by the winch. When the winch is operated, the winch may pull the mandrel 214 out of the stiffening member 212.

Figure 6:
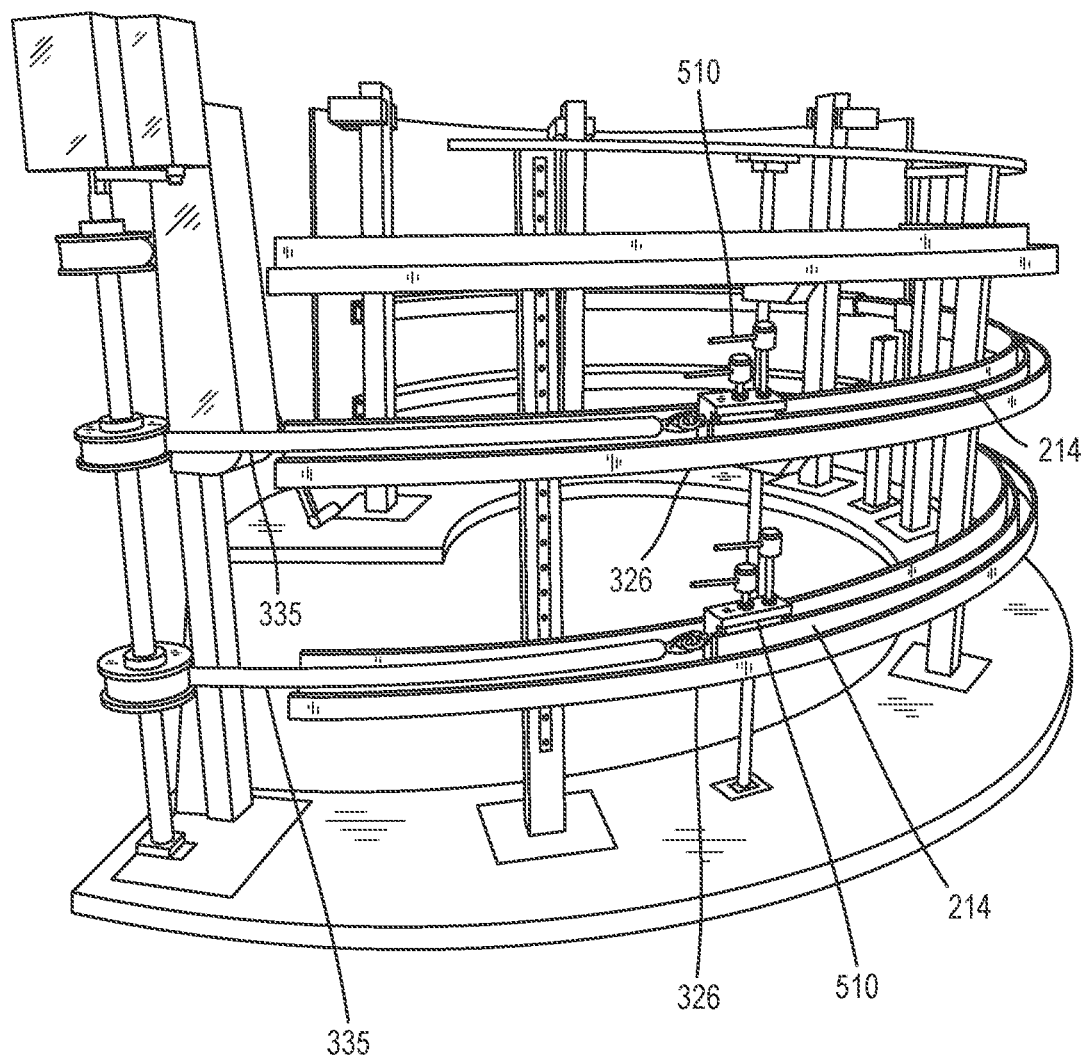
FIG. 6 illustrates a perspective view of a plurality of mandrels being removed from a panel in accordance with various embodiments.

Referring to FIG. 6, a perspective view of two mandrels 214 being removed is illustrated according to various embodiments. The straps 335 may pull the mandrel clamps 510 which are coupled to the mandrels 214. The mandrels 214 may be pulled into the curved tracks 326. The mandrels 214 may remain in a curved shape in the curved tracks 326 to prevent deformation of the mandrels 214.

Figure 7:
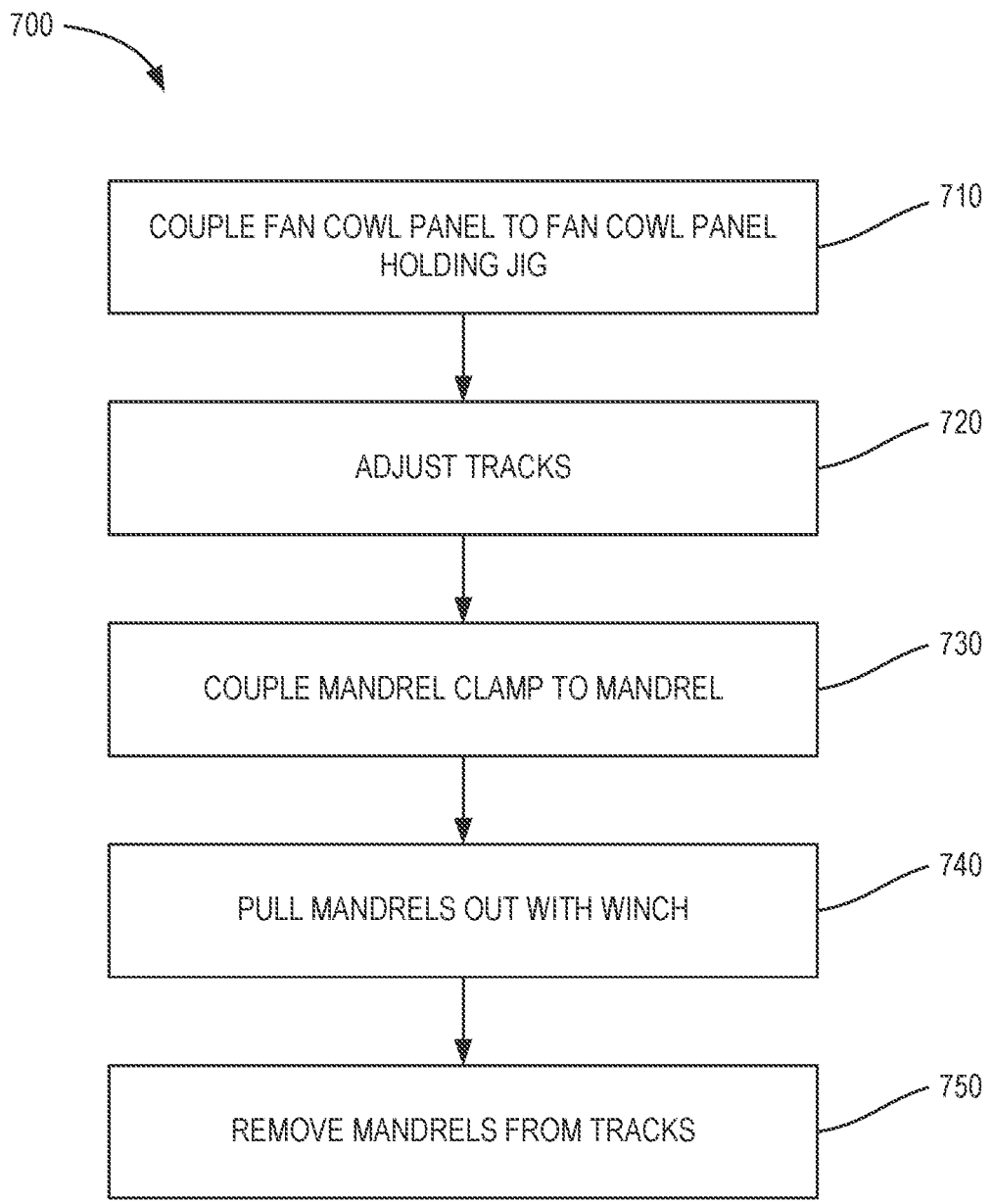
FIG. 7 illustrates a flow chart of a process for removing a mandrel in accordance with various embodiments.

Referring to FIG. 7, a flowchart of a process 700 for removing mandrels is illustrated according to various embodiments. A panel may be coupled to a holding jig (step 710). In various embodiments, the panel may be clamped to the holding jig. The panel may be oriented such that the stiffening members are horizontal, i.e. parallel to the ground. Tracks in a mandrel extraction jig may be adjusted to correspond to the height of the mandrels (step 720). A mandrel clamp may be coupled to a mandrel in a stiffening member in the panel (step 730). In various embodiments, a mandrel clamp may be coupled to each mandrel in the panel. A winch may be operated to pull the mandrels out of the stiffening members (step 740). The mandrels may be pulled into the tracks in the mandrel extraction jig. The clamps may be detached from the mandrels, and the mandrels may be removed from the mandrel extraction jig (step 750). The panel may be removed, and additional panels may be coupled to the holding jig to remove mandrels.

Although described primarily with reference to fan cowl panels, those skilled in the art will recognize that the systems and method described herein may be used to remove mandrels from many different components in various industries.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

We claim:

1. A method of manufacturing a composite panel with at least one stiffening member formed around a removable mandrel comprising:
    forming a cured composite panel by co-curing a skin and a hollow stiffening member so that they form a unitary structure;
    coupling the cured composite panel to a panel holding jig;
    coupling a clamp to the removable mandrel situated between the skin of the cured composite panel and the hollow stiffening member, the removable mandrel being supported on a curved track; and
    operating a winch to extract the removable mandrel from the cured composite panel, the removable mandrel maintaining a curved shape while the removable mandrel is extracted.

2. The method of claim 1, further comprising pulling the removable mandrel into the curved track.

3. The method of claim 2, further comprising adjusting a height of the curved track.

4. The method of claim 1, further comprising clamping the cured composite panel to the panel holding jig.

5. The method of claim 1, further comprising pulling a plurality of mandrels from the cured composite panel simultaneously using the winch.

6. The method of claim 1, further comprising operating the winch with a hand crank.

7. The method of claim 1, wherein the winch comprises a plurality of spools.

* * * * *